United States Patent
Abuelsaad et al.

(10) Patent No.: US 11,675,828 B2
(45) Date of Patent: Jun. 13, 2023

(54) VISUAL REPRESENTATION COHERENCE PRESERVATION

(71) Applicant: INTERNATIONAL BUSINESS MACHINES CORPORATION, Armonk, NY (US)

(72) Inventors: Tamer E. Abuelsaad, Yorktown, NY (US); Ayush Shah, Gurgaon (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 221 days.

(21) Appl. No.: 16/674,313

(22) Filed: Nov. 5, 2019

(65) Prior Publication Data

US 2021/0133232 A1    May 6, 2021

(51) Int. Cl.
*G06F 16/58* (2019.01)
*G06F 16/55* (2019.01)
*G06F 16/54* (2019.01)
*G06F 40/205* (2020.01)

(52) U.S. Cl.
CPC .......... *G06F 16/5866* (2019.01); *G06F 16/54* (2019.01); *G06F 16/55* (2019.01); *G06F 40/205* (2020.01)

(58) Field of Classification Search
CPC .... G06F 16/5866; G06F 40/205; G06F 16/54; G06F 16/55
See application file for complete search history.

(56) References Cited

U.S. PATENT DOCUMENTS

| 7,512,537 B2 | 3/2009 | Pahud et al. |
| 8,131,734 B2 | 3/2012 | Austin et al. |
| 8,275,620 B2 | 9/2012 | Paulino et al. |

(Continued)

FOREIGN PATENT DOCUMENTS

WO    2016153510 A1    9/2016

OTHER PUBLICATIONS

Adobe Sensei, "Creativity. Workflows. Experiences. All Made Smarter With Adobe Sensei", https://www.adobe.com/in/sensei.html, printed Sep. 11, 2019, pp. 1-8.

(Continued)

*Primary Examiner* — Albert M Phillips, III
*Assistant Examiner* — Courtney Harmon
(74) *Attorney, Agent, or Firm* — Lily Neff

(57) ABSTRACT

A method, a computer program product, and a computer system determine and arrange images to include in a visual representation. The method includes receiving a textual statement and identifying a plurality of terms in the textual statement that are to be visualized in the visual representation. The method includes generating a plurality of sequences of images where each image in a given one of the sequences is associated with one of the terms. Each image is associated with at least one tag. The method includes determining a global coherence and a local coherence for each of the sequences based on the tags of the images. The method includes selecting one of the sequences based on the global coherence and the local coherence. The method includes generating the visual representation where the images of the selected sequence are included.

18 Claims, 8 Drawing Sheets

(56) References Cited

U.S. PATENT DOCUMENTS

| | | | |
|---|---|---|---|
| 8,458,598 B1 * | 6/2013 | Hakel | G11B 27/031 |
| | | | 705/14.66 |
| 8,559,764 B2 | 10/2013 | Malik | |
| 8,571,331 B2 | 10/2013 | Cifarelli | |
| 9,836,671 B2 | 12/2017 | Gao et al. | |
| 9,858,264 B2 | 1/2018 | Dutta et al. | |
| 10,437,833 B1 * | 10/2019 | Nguyen | G06N 5/041 |
| 10,685,057 B1 * | 6/2020 | Chavez | G06F 16/248 |
| 2006/0080306 A1 | 4/2006 | Land | |
| 2007/0200872 A1 | 8/2007 | Bowie et al. | |
| 2011/0078564 A1 | 3/2011 | Herraiz et al. | |
| 2013/0124951 A1 | 5/2013 | Shechtman | |
| 2013/0155088 A1 | 6/2013 | Wang | |
| 2013/0188887 A1 | 7/2013 | Chan | |
| 2015/0213001 A1 | 7/2015 | Levy et al. | |
| 2017/0132461 A1 | 5/2017 | Chan et al. | |
| 2018/0046708 A1 | 2/2018 | Stewart et al. | |
| 2019/0095393 A1 | 3/2019 | Shu et al. | |
| 2021/0034657 A1 * | 2/2021 | Kale | G06F 16/48 |

OTHER PUBLICATIONS

Gupta et al., "Imagine This! Scripts to Compositions To Videos", Apr. 10, 2018, arXiv:1804.03608v1, pp. 1-22.

https://www.mysimpleshow.com/, "Create Your Simpleshow Explainer Video In Minutes", printed Sep. 11, 2019, pp. 1-11.

Kim et al., "Ranking And Retrieval Of Image Sequences From Multiple Paragraph Queries", 2015, IEEE, pp. 1993-2001.

Li et al., "StoryGAN: A Sequential Conditional GAN For Story Visualization", Microsoft Dynamics 365 AI Research, Apr. 18, 2019, arXiv:1812.02784v2 [cs.CV], pp. 1-11.

Mell et al., "The NIST Definition of Cloud Computing", National Institute of Standards and Technology, Special Publication 800-145, Sep. 2011, pp. 1-7.

Park et al., "Expressing An Image Stream With A Sequence Of Natural Sentences", https://papers.nips.cc/paper/5776-expressing-an-image-stream-with-a-se . . . , NIPS Proceedings, 2015, pp. 1-11.

Zhou et al., "Moments in Time", http://moments.csail.mit.edu/, printed Sep. 11, 2019, pp. 1-10.

Zhu et al., "A Text-To-Picture Synthesis System For Augmenting Communication", Association for the Advancement of Artificial Intelligence (www.aaai.org), 2007, pp. 1-6.

* cited by examiner

PROCESSING RESULTS
250

| BUCKET LABEL | IMAGE ID | TAG #1 | TAG #2 | TAG #3 | TAG #4 |
|---|---|---|---|---|---|
| FRUITS | 1 | 1 | 1 | 1 | 1 |
| FRUITS | 2 | 0 | 1 | 1 | 1 |
| FRUITS | 3 | 1 | 0 | 1 | 0 |
| HEALTHY DIET | 4 | 0 | 0 | 1 | 1 |
| HEALTHY DIET | 5 | 0 | 0 | 0 | 0 |
| HEALTHY DIET | 6 | 1 | 0 | 1 | 1 |
| RAW | 7 | 0 | 1 | 1 | 1 |
| RAW | 8 | 0 | 1 | 1 | 1 |
| RAW | 9 | 1 | 0 | 1 | 1 |
| SLICE | 10 | 1 | 0 | 1 | 1 |
| SLICE | 11 | 1 | 0 | 1 | 1 |
| SLICE | 12 | 0 | 0 | 1 | 0 |
| JUICE | 13 | 1 | 0 | 1 | 1 |
| JUICE | 14 | 0 | 1 | 1 | 1 |
| JUICE | 15 | 0 | 0 | 1 | 0 |

Columns: 252, 254, 256, 258, 260, 262

FIG. 2B

SCORING RESULTS
275

| BUCKET LABEL | IMAGE ID | TAG #1 | TAG #2 | TAG #3 | TAG #4 | LOCAL OVERLAP |
|---|---|---|---|---|---|---|
| FRUITS | 1 | 1 | 1 | 1 | 1 | 2/4 (0.5) |
| HEALTHY DIET | 4 | 0 | 0 | 1 | 1 | 2/4 (0.5) |
| RAW | 7 | 0 | 1 | 1 | 1 | 2/4 (0.5) |
| SLICE | 10 | 1 | 0 | 1 | 1 | 3/4 (0.75) |
| JUICE | 13 | 1 | 0 | 1 | 1 | |
| TAG POPULARITY | --- | 3/5 (0.6) | 2/5 (0.4) | 5/5 (1.0) | 5/5 (1.0) | |

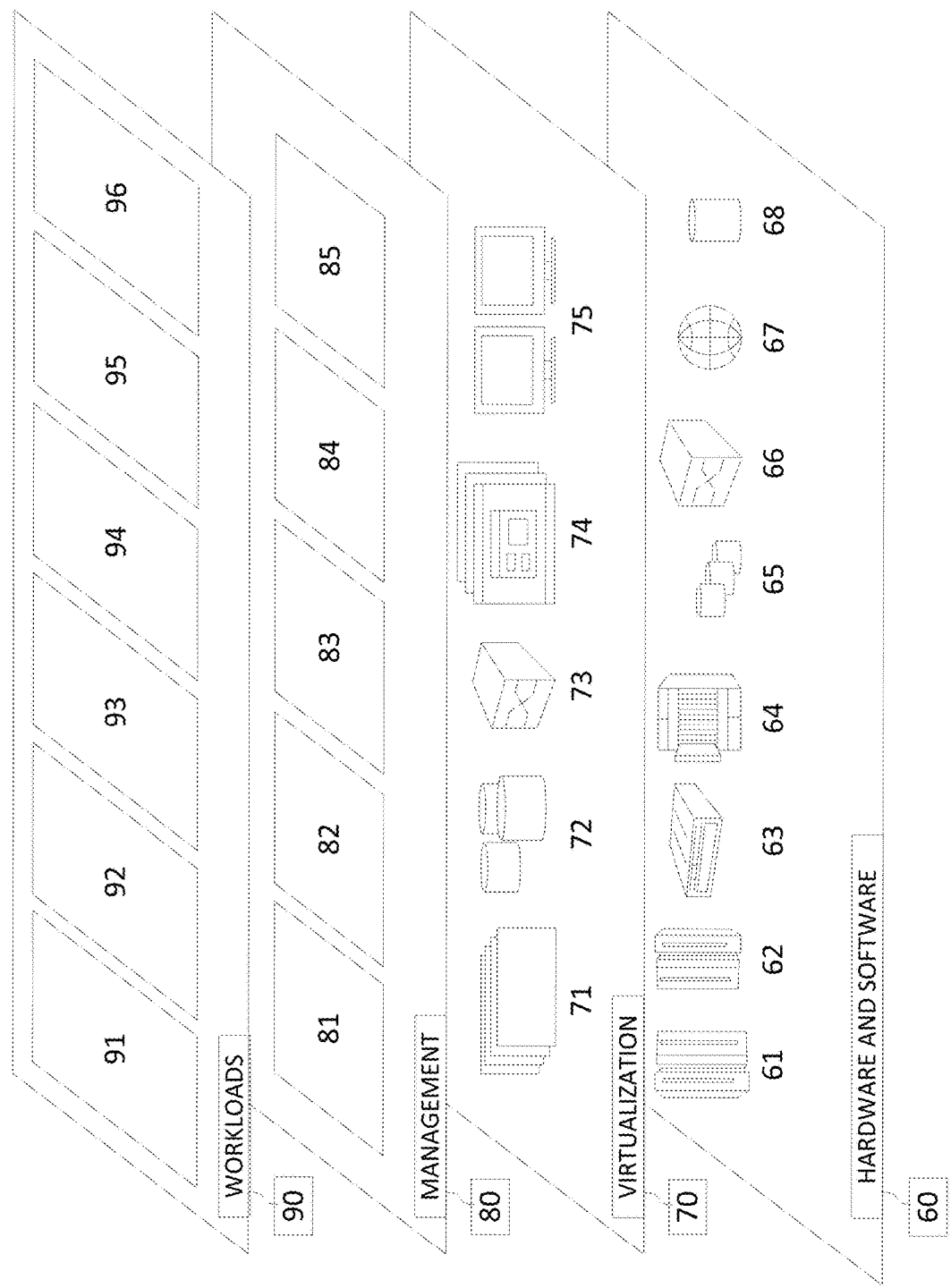

VISUAL REPRESENTATION COHERENCE PRESERVATION

BACKGROUND

The exemplary embodiments relate generally to visual representations, and more particularly to determining and arranging images to include in the visual representations.

Videos may provide a medium for learning for a wide variety of age groups. For example, a set of images may be arranged sequentially that is paired with words for an individual to learn a language. While videos are used extensively in learning environments, a creator is required to manually create the video where even a simplest form of a video often entails a fairly intensive production process. For example, the creator may have to wade through a vast library of images and manually select those images that pertain to a given set of words. As a lesson becomes more complex, the complexity of the video to be created may also increase. However, in view of the conventional manual approach to video creation, the production process does not scale well. Furthermore, if the video is to be created for an individual student, the creator is posed with an even more difficult task to curate or create the video that is suitable for the individual student. In considering the sheer variety of learning concepts that respective students may need to be exposed, the video production process may become exponentially more difficult, intensive, and time consuming.

In another example of utilizing a set of images for a given purpose, a user may create a slideshow in which images are selected to be included in the slideshow where a plurality of images is each shown for a predetermined amount of time in a consecutive manner. Accordingly, under a conventional approach, the user manually selects each of the images to be included in the slide show and in the order to be shown. There have been approaches that provide an automated process of selecting images to be included in the slideshow. For example, the user may select the images and a slideshow program may generate the slideshow so that the images are shown in a selected order.

U.S. Publ. Appln. No 2013/0155088 describes a conventional approach utilizing an automated process to create a slideshow in which representative images are selected for representative classes inferred from subsections of a photobook. The slideshow is created according to a deduced intent of a user based on an inputted photobook. When the user selects a theme of the photobook, an intent of the photographer may be determined which forms the basis upon which to select the images to be included. However, this conventional approach is only configured to select the images and leaves an arrangement of the images to the user. Accordingly, this conventional approach only provides an automated manner of selecting images based on, for example, tags or metadata of the images but does not provide an automated manner of arranging the images, particularly based on context inference as a whole and across adjacent images to maintain context. Furthermore, this conventional approach is not reasonably portable to be used with textual scripts such as in a learning environment.

U.S. Pat. No. 8,571,331 describes a conventional approach in which content based images are selected for an automated process of generating a photo album. For a given event, a plurality of images is received and clusters of images are created where each cluster of images has at least a certain similarity. A density value of the data distribution with each cluster is estimated and at least one local maximum associated with each cluster is identified. Based on these calculations, an image from each cluster is selected as a candidate for inclusion in the photo album. Accordingly, this conventional approach only provides an automated manner of grouping images based on similarity but does not provide an automated manner of arranging the images, particularly based on context inference as a whole and across adjacent images to maintain context. Furthermore, this conventional approach is not reasonably portable to be used with textual scripts such as in a learning environment.

There have also been conventional approaches related to transitioning from one image to another (e.g., across adjacent images). U.S. Pat. No. 8,811,771 describes a conventional approach in which image transitions are performed based on content of the images. Image content within each image of setoff images are analyzed to determine at least one respective characteristic metric for each image. By calculating a respective transition score for each pair of at least a subset of the images, transition effects to be implemented between successive images for a sequence of images may then be determined. However, this conventional approach is with regard to determining a transition effect but does not provide an automated manner of arranging the images, particularly based on context inference as a whole and across adjacent images to maintain context. Furthermore, this conventional approach is not reasonably portable to be used with textual scripts such as in a learning environment.

There have further been conventional approaches that pair images to text. U.S. Pat. No. 8,731,339 describes a conventional approach for automatically generating video from text. This conventional approach receives an image of printed text, translates the text of the image to text in a machine readable format, and generates model information based on the translated text. The conventional approach also generates a synthesized images sequence based on the model information and on preferences selected by the user. Accordingly, this conventional approach only provides an automated manner of determining text from an image and selecting images for the determined text but does not provide an automated manner of arranging the images, particularly based on context inference as a whole and across adjacent images to maintain context. In addition, this conventional approach utilizes an access to every image in the repository and relies on access to all tags associated with the images which is a scenario that is not reasonably possible. The issue is further magnified when using third party image repositories which may not provide the type of access upon which this conventional approach relies.

There are still other conventional approaches that relate text to images. For example, a tool may identify a keyword from text corresponding to which images are available. The image cut-outs are brought together on a screen to create a visual description similar to the text. However, there is no automated mechanism in which a context is maintained globally across all images and locally between adjacent images. In another example, images linked to text are selected with no consideration of maintaining context.

SUMMARY

The exemplary embodiments disclose a method, a computer program product, and a computer system for determining and arranges images to include in a visual representation. The method comprises receiving a textual statement and identifying a plurality of terms in the textual statement that are to be visualized in the visual representation. The method comprises generating a plurality of sequences of images where each image in a given one of the sequences is associated with one of the terms. Each image is associated with at least one tag. The method comprises determining a global coherence and a local coherence for each of the sequences based on the tags of the images. The method comprises selecting one of the sequences based on the global coherence and the local coherence. The method comprises generating the visual representation where the images of the selected sequence are included.

In a preferred embodiment, the method further comprises identifying a plurality of image buckets having a respective associated term based on the identified terms in the textual statement. The images for the given sequence are selected from the identified image buckets.

In a preferred embodiment, the global coherence is sequence agnostic.

In a preferred embodiment, the local coherence is based on adjacent images within the sequence of images.

In a preferred embodiment, the selected sequence is selected based on whether the global coherence is at least a predetermined global threshold, whether the local coherence is at least a predetermined local threshold, or a combination thereof.

In a preferred embodiment, the selected sequence has a highest global coherence, a highest local coherence, or a combination thereof.

In a preferred embodiment, the global coherence and the local coherence is based on a tag popularity.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which:

FIGS. 2A-C depict an exemplary image processing sequence, in accordance with the exemplary embodiments.

FIG. 6 depicts abstraction model layers, in accordance with the exemplary embodiments.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
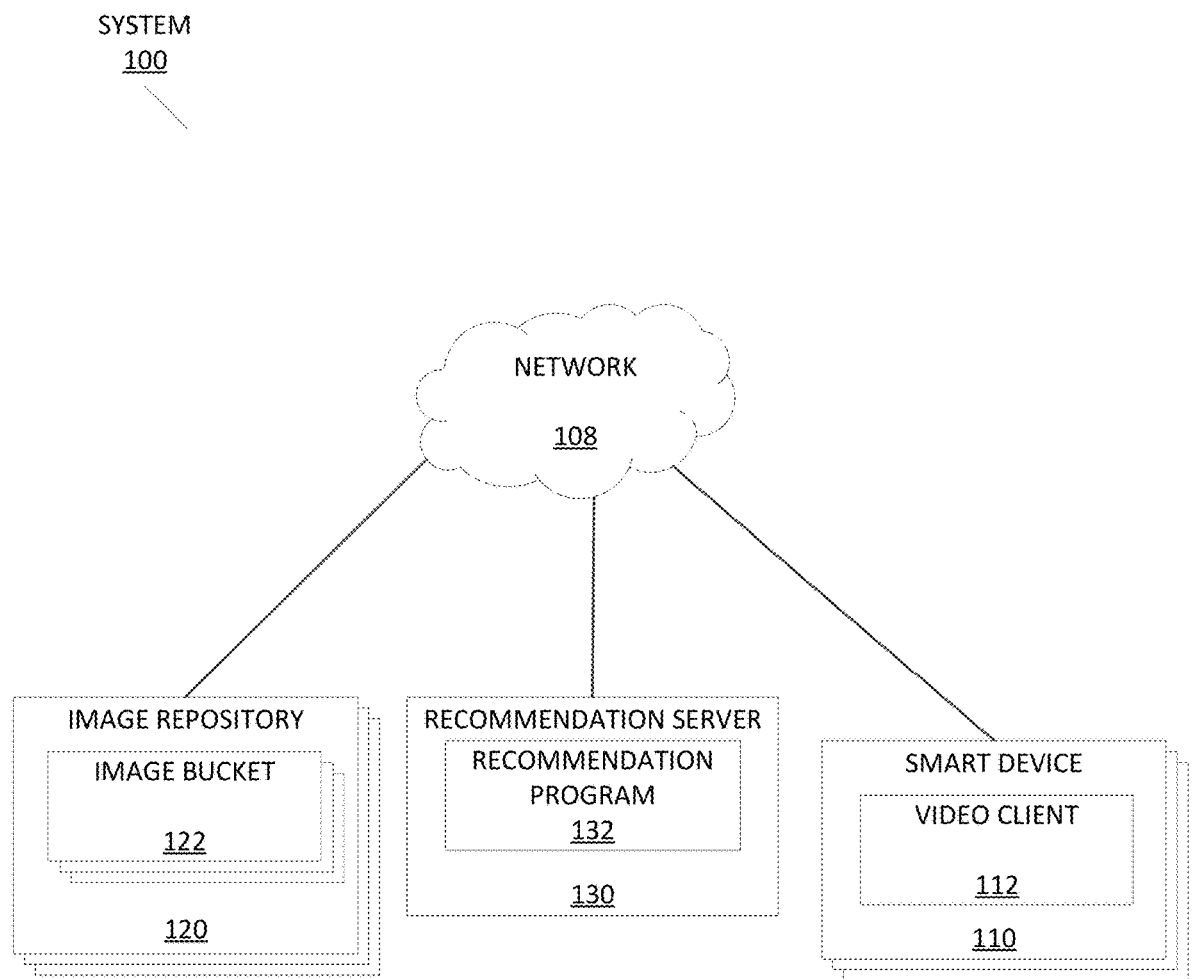
FIG. 1 depicts an exemplary schematic diagram of an image selection system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for determining images to include in a visual representation that are shown consecutively and a context is maintained throughout the visual representation as well as between adjacent images. As will be described in greater detail herein, the exemplary embodiments are configured to receive a textual statement, identify terms for which a respective image is to be shown, and select an image for a given term so that the selected images are shown in an order corresponding to an order of the terms in the textual statement. The exemplary embodiments provide a mechanism to maintain a context in a global manner in which a context throughout the entire visual representation is substantially maintained and in a local manner in which a context between consecutive images in the visual representation is substantially maintained. Accordingly, the exemplary embodiments describe a platform to auto-generate age-appropriate and engaging videos or visual representations using a sequence of images and videos to offer a scalable solution in the production process for visual representations. Key benefits of the exemplary embodiments may include selecting images from images organized in buckets that map to parts of textual statements so that a global and a local visualization remains coherent. Detailed implementation of the exemplary embodiments follows.

The exemplary embodiments are described with regard to determining images to include in a visual representation corresponding to a textual statement. However, the exemplary embodiments may be implemented in any arrangement of items that are ordered to maintain context for a global and a local coherence. For example, in another implementation involving images, the exemplary embodiments may be used for a slideshow that is unrelated to text. The slideshow may be with regard to a theme in which a global coherence is maintained and a local coherence is maintained between consecutive images. In another example, in an implementation involving non-image items, the exemplary embodiments may be used for a presentation involving visual aids. The objects used as visual aids may be selected so that a global coherence corresponding to the presentation as a whole is maintained while a local coherence between consecutive objects is also maintained. In a further example, in an implementation involving non-visual items, the exemplary embodiments may be used for an audio presentation involving a plurality of audio sounds. The sounds may be selected so that a global and local coherence is maintained.

FIG. 1 depicts an image selection system 100, in accordance with the exemplary embodiments. According to the exemplary embodiments, the image selection system 100 may include one or more smart devices 110, one or more image repositories 120, and a recommendation server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the image selection system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the image selection system 100 that do not utilize the network 108.

In the exemplary embodiments, the smart device 110 may include a video client 112 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the video client 112 may act as a client in a client-server relationship and may be a software, hardware, and/or firmware based application capable of joining a meeting via the network 108. In embodiments, the video client 112 may operate as a user interface allowing a participant to interact with one or more components of the image selection system 100, and utilize various wired and/or wireless connection protocols for data transmission and exchange associated with joining the meeting, including Bluetooth, 2.4 gHz and 5 gHz internet, near-field communication, Z-Wave, Zigbee, etc. The video client 112 may also be configured to illustrate aspects of different recommended visual representations, provide a response for a recommended visual representation, and generate and view a visual representation corresponding to the selected recommended visual representation for a requested textual statement.

The video client 112 may allow the user of the smart device 110 to provide inputs related to generating a visual representation. The video client 112 may present a user interface on which the user may enter a textual statement for which the visual representation is to be generated. For example, the textual statement may be a sentence or a set of words used in an educational program (e.g., to learn a language, to learn grammar, to learn vocabulary, etc.). The textual statement may be transmitted for further processing so that a corresponding visual representation is generated. An example of the textual statement and the manner with which the textual statement is processed to select corresponding images in generating a visual representation will be described in further detail below with regard to FIGS. 2A-C and 3.

The video client 112 may receive at least one recommended visual representation. In each recommended visual representation, the video client 112 may show the user the images that were selected to be included in the respective recommended visual representation. The video client 112 may also show information regarding each recommended visual representation. For example, the video client 112 may indicate a determined coherence at a global level and a local level. The user may then use the video client 112 to select a visual representation to be used with the textual statement that is most optimal for the needs of the user by considering any trade-off in the optimization for a given recommended visual representation. Upon selection, the video client 112 may receive the selected recommended visual representation that is compatible with the video client 112 or other program for the purposes of the user.

In the exemplary embodiments, the image repository 120 may include one or more image buckets 122 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the image repository 120 is shown as a single device, in other embodiments, the image repository 120 may be comprised of a cluster or plurality of electronic devices, in a modular manner, etc., working together or working independently. While the image repository 120 is also shown as a separate component, in other embodiments, the image repository 120 may be incorporated with one or more of the other components of the image selection system 100. For example, the image repository 120 may be incorporated in the recommendation server 130. Thus, access to the image repository 120 by the recommendation server 130 may be performed locally. In this manner, the images contained in the image buckets of the image repository 120 may be universally utilized by any user of the smart device 110 in generating a visual representation. In another example, the image repository 120 may be incorporated in the smart device 110 (e.g., each smart device 110 has an image repository 120). Thus, access to the image repository 120 and to a specific one of the image buckets 122 may be performed through a transmission from the smart device 110. In this manner, the images contained in the image buckets of the image repository may be locally utilized by a specific user associated with a smart device 110 storing the image repository 120. The image repository 120 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the image buckets 122 may respectively be associated with one or more terms. Each image in the image buckets 122 may respectively be associated with one or more tags. As will be described in further detail below, the associated terms of the image buckets 122 and the associated tags of the images in the image buckets 122 may provide a basis upon which an image selection mechanism is performed as well as determine a global coherence across all images used in a visual representation and a local coherence between adjacent images in the visual representation. For example, results from processing the textual statement may be a set of terms that are matched with the terms of the image buckets 122. In another example, a selection of images from the selected image buckets 122 may have tags that are considered in a global and local level to determine a global and local coherence, respectively.

In the exemplary embodiments, the recommendation server 130 may include a recommendation program 132 and act as a server in a client-server relationship with the video client 112 as well as be in a communicative relationship with the image repository 120. The recommendation server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the recommendation server 130 is shown as a single device, in other embodiments, the recommendation server 130 may be comprised of a cluster or plurality of computing devices, working together or working independently. The recommendation server 130 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the recommendation program 132 may be a software, hardware, and/or firmware application configured to process an input from the video client 112, determine images to include in a visual representation, and determine a coherence across the images of the visual representation at a global and a local level. In an example operation, the recommendation program 132 may receive the textual statement from the video client 112 as requested by the user of the smart device 110. The recommendation program 132 may process the textual statement to determine terms for which the visual representation is to be generated. In another example operation, the recommendation program 132 may utilize the determined terms to select image buckets 122 in the image repository 120 from which images are to be selected to be included in the visual representation. In a further example operation, the recommendation program 132 may generate a plurality of sequences of images representing a corresponding recommended visual representation where the images are selected from each of the image buckets 122. For each sequence, the recommendation program 132 may utilize one or more respective tags of the images in a given recommended visual representation to determine a global and a local coherence.

The recommendation program 132 may further be configured to select one or more recommended visual representations for presentation to the user of the smart device 110 via the video client 112. In providing the selected recommended visual representations, the recommendation program 132 may include the images (e.g., thumbnails, full images, etc.) and various types of information. For example, for a given recommended visual representation, the recommendation program 132 may indicate a global coherence across all the images of the recommended visual representation. In another example, for a given recommended visual representation, the recommendation program 132 may indicate a local coherence between adjacent images in a sequence of the images in the recommended visual representation (e.g., between the first and second images, between the second and third images, between the N−1 and the N images, etc.). As a result of providing the one or more recommended visual representations, the recommendation program 132 may receive a selection among the recommended visual representations that were presented to the user of the smart device 110 via the video client 112. Based on the selection of one of the recommended visual representations, the recommendation program 132 may package an output for the smart device 110 such that a visual representation corresponding to the selected recommended visual representation as indicated by the user is generated for the purposes of the user.

Figure 3:
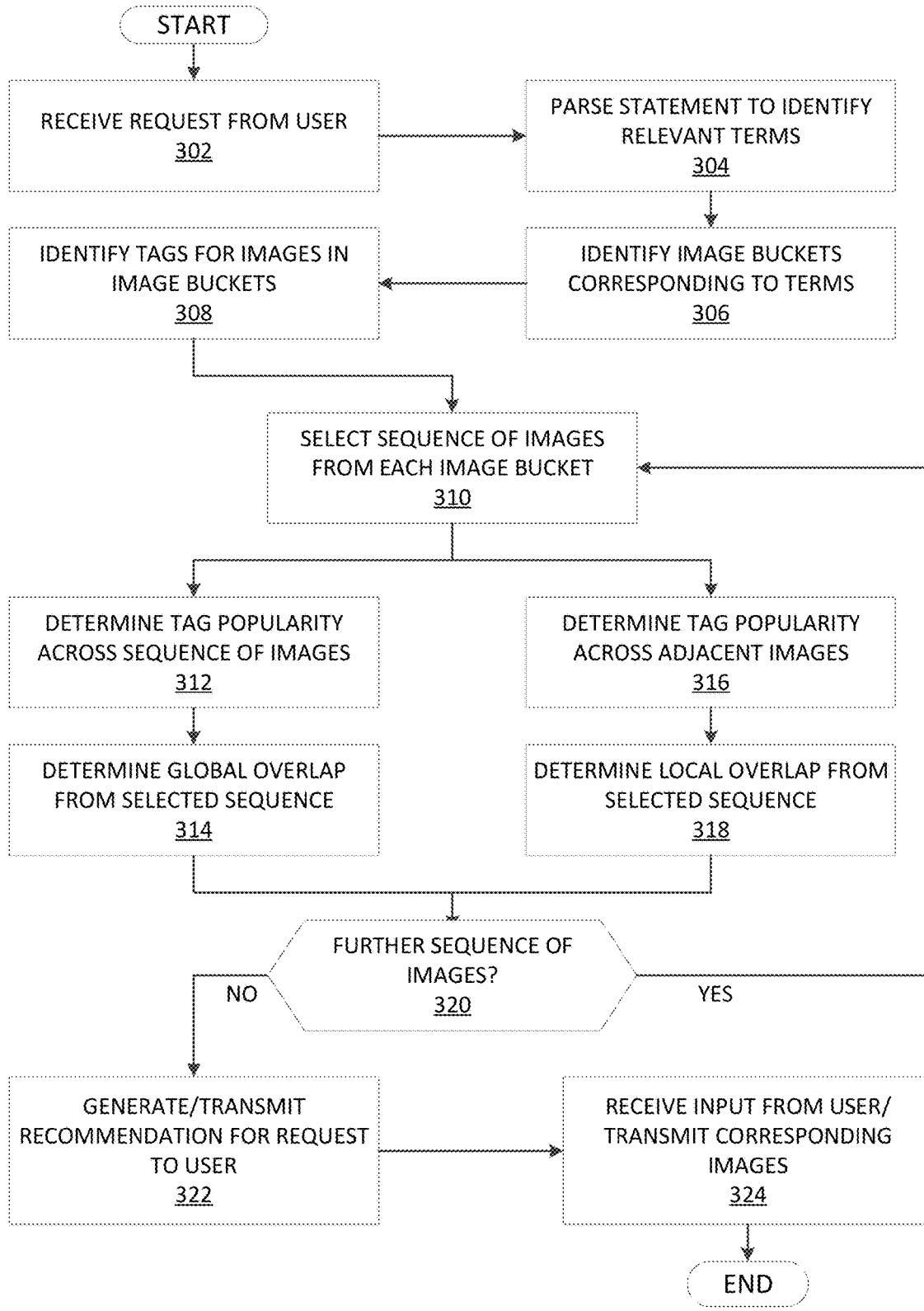
FIG. 3 depicts an exemplary flowchart of a method illustrating the operations of a recommendation program 132 of the image selection system 100 in determining images to be included in a visual representation, in accordance with the exemplary embodiments.

FIG. 3 illustrates an exemplary flowchart of a method 300 illustrating the operations of the recommendation program 132 of the image selection system 100 in determining images to be included in a visual representation, in accordance with the exemplary embodiments. The method 300 is described with regard to the image repository 120 being a network component accessible by the recommendation program 132 as a universal source from which images may be selected for requests of textual statements received by the smart device 110 via the video client 112. Accordingly, the image buckets 122 may be available as well as a mapping to terms of the textual statement required to visualize the textual statement. The method 300 provides an exemplary mechanism according to the exemplary embodiments to select images from the image buckets 122 so that the visual representation is coherent on a global and a local level.

The recommendation program 132 may receive a request from a user based on an input provided to the video client 112 that is transmitted to the recommendation server 130 (step 302). The input may be in any format that corresponds to the purposes of the user. For example, the input may be based on text for which a visual aid is to accompany the text for educational purposes. The user may utilize the video client 112 on the smart device 110 to input the textual statement that is transmitted to the recommendation program 132.

To further illustrate the operations of the recommendation program 132, reference is now made to an illustrative exemplary embodiment. According to the illustrative exemplary embodiment, the recommendation program 132 may receive a textual statement from the video client 112. The textual statement may be for an educational purpose to describe various words. For example, the user may enter the textual statement: "Fruits are part of a healthy diet. They can be served as raw, sliced or in the form of juices."

The recommendation program 132 may process the input to identify relevant terms (step 304). As a result of the input being a textual statement, the recommendation program 132 may be configured to parse the statement to identify terms. The terms may be ones that may be represented visually. Accordingly, the recommendation program 132 may select certain terms while omitting other terms in the textual statement. For example, depending on the educational purpose, the recommendation program 132 may select nouns while omitting other parts of speech (e.g., omit verbs, pronouns, etc.).

According to the previously introduced exemplary embodiment, the educational purpose for which the visual representation is to be generated for the textual statement is to portray words visually for comprehension by the student. As a result of this educational purpose, the recommendation program 132 may identify the terms as nouns to visually show a meaning. According to the textual statement of this exemplary embodiment, the recommendation program 132 may identify the terms of the textual statement as fruits, healthy diet, raw, sliced, and juices.

The recommendation program 132 may identify image buckets 122 included in the image repository 120 that correspond to the terms identified in the textual statement (step 306). As described above, the image repository 120 may include a plurality of image buckets 122 where each of the image buckets 122 are associated with one or more terms. Thus, in generating the visual representation, the recommendation program 132 may identify the image buckets 122 that have terms that correspond to the terms identified in the input received from the user. The recommendation program 132 may be configured with natural language processing and/or other language processing features in finding corresponding terms. For example, the recommendation program 132 may determine whether a pluralization of a term is required. In another example, the recommendation program 132 may determine whether a term being singular for a pluralized term or vice versa is acceptable.

Figure 2A:
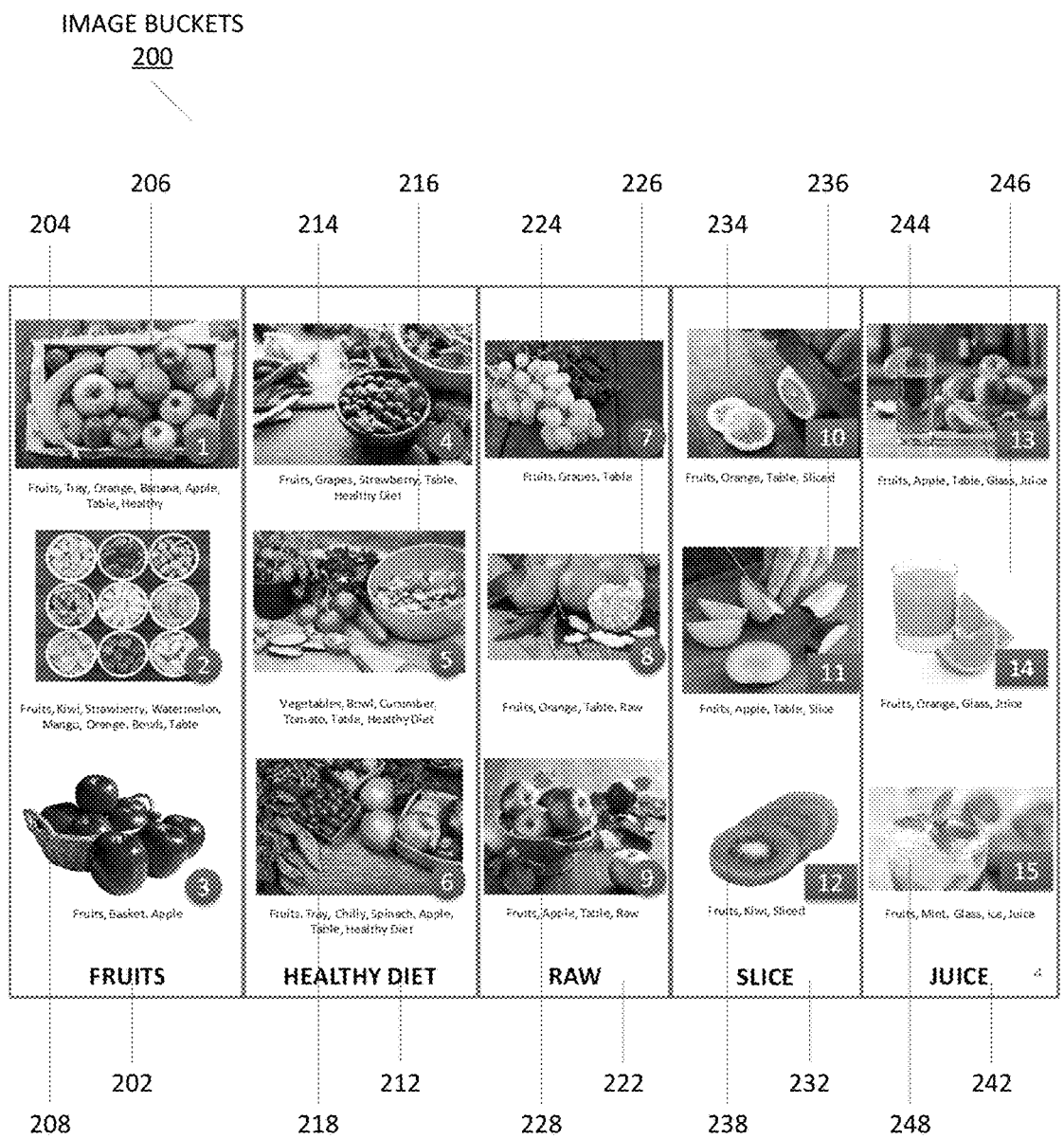

With reference again to the previously introduced exemplary embodiment, the image repository 120 may include a plurality of image buckets 122 from which the recommendation program 132 selects. FIG. 2A depicts an exemplary set of image buckets 200, in accordance with the exemplary embodiments. The image buckets 200 illustrated in FIG. 2A may represent the image buckets 122 of the image repository 120 that have been selected based on the terms determined in the textual statement received from the user of the smart device 110. As illustrated, the image buckets 200 may include image buckets 202, 212, 222, 232, and 242, each having a respective associated term. With regard to the above example regarding the textual statement "Fruits are part of a healthy diet. They can be served as raw, sliced or in the form of juices," the recommendation program 132 may have determined the terms fruits, healthy diet, raw, sliced, and juices. Accordingly, the recommendation program 132 may have selected the image buckets 202, 212, 222, 232, 242 that have corresponding terms associated therewith. For example, the image bucket 202 may have the associated term "fruits"; the image bucket 212 may have the associated term "healthy diet"; the image bucket 222 may have the associated term "raw"; the image bucket 232 may have the associated term "slice"; and the image bucket 242 may have the associated term "juice."

The recommendation program 132 may identify tags for the images that are contained in the image buckets 122 that have been identified having corresponding terms to the determined terms of the input from the user of the smart device 110 (step 308). For the image buckets 122 having an associated term, each of the image buckets 122 may include one or more images where each image has one or more associated tags. As will be described below, the recommendation program 132 may utilize the tags of the images to determine a global and local coherence.

Referring now to the previously introduced, illustrative exemplary embodiment, each of the image buckets 202, 212, 222, 232, 242 may have one or more images contained therein. For illustrative purposes, the image buckets 202, 212, 222, 232, 242 are shown each with three images. However, those skilled in the art will understand that the buckets 202, 212, 222, 232, 242 may include any number of images within the scope of the exemplary embodiments. For example, the image bucket 202 having the associated term "fruits" may have images 204, 206, 208; the image bucket 212 having the associated term "healthy diet" may have images 214, 216, 218; the image bucket 222 having the associated term "raw" may have images 224, 226, 228; the image bucket 232 having the associated term "slice" may have images 234, 236, 238; and the image bucket 242 having the associated term "juice" may have images 244, 246, 248. Each of the images in the image buckets 202, 212, 222, 232, 242 may have respective image identifications or ids that uniquely identify the image. For example, the image 204 may have an image id 1, the image 206 may have an image id 2, the image 208 may have an image id 3, the image 214 may have an image id 4, the image 216 may have an image id 5, the image 218 may have an image id 6, the image 224 may have an image id 7, the image 226 may have an image id 8, the image 228 may have an image id 9, the image 234 may have an image id 10, the image 236 may have an image id 11, the image 238 may have an image id 12, the image 244 may have an image id 13, the image 246 may have an image id 14, and the image 248 may have an image id 15. However, it is noted that the recommendation program 132 and/or the image repository 120 may utilize any image id nomenclature that those skilled in the art will readily understand.

Also shown in FIG. 2A for each image in the image buckets 202, 212, 222, 232, 242 are the tags for each image. For example, for the image bucket 202, the image 204 may have associated tags "fruits," "tray," "orange," "banana," "apple," "table," and "healthy". The image 206 may have associated tags "fruits," "kiwi," "strawberry," "watermelon," "mango," "orange," "bowls," and "table." The image 208 may have associated tags "fruits," "basket," and "apple." For the image bucket 212, the image 214 may have associated tags "fruits," "grapes," "strawberry," "table," and "healthy diet." The image 216 may have associated tags "vegetables," "bowl," "cucumber," "tomato," "table," and "healthy diet." The image 218 may have associated tags "fruits," "tray," "chilly," "spinach," "apple," "table," and "healthy diet." For the image bucket 222, the image 224 may have associated tags "fruits," "grapes," and "table." The image 226 may have associated tags "fruits," "orange," "table," and "raw." The image 228 may have associated tags "fruits," "apple," "table," and "raw." For the image bucket 232, the image 234 may have associated tags "fruits," "orange," "table," and "sliced." The image 236 may have associated tags "fruits," "apple," "table," and "slice." The image 238 may have associated tags "fruits," "kiwi," and "sliced." For the image bucket 242, the image 244 may have associated tags "fruits," "apple," "table," "glass," and "juice." The image 246 may have associated tags "fruits," "orange," "glass," and "juice." The image 248 may have associated tags "fruits," "mint," "glass," "ice," and "juice."

The recommendation program 132 may select a sequence of images from each image bucket 122 for a potential visual representation (step 310). The recommendation program 132 may be configured to determine one or more sequences of images that correspond to a potential visual representation which may then be further processed, as will be described below. In generating the potential visual representation, the recommendation program 132 may select an image from each of the image buckets 122 having the corresponding terms. Therefore, having determined N image buckets 122 corresponding to the terms of the input from the user of the smart device 110, the recommendation program 132 may select an image from each of the N image buckets 122 and generate a potential visual representation with N images. The recommendation program 132 may order the images in a sequence that corresponds to an order of the terms in the input from the user of the smart device 110.

With reference again to the illustrative exemplary embodiment, the recommendation program 132 may select sequences of images selected from the image buckets 202, 212, 222, 232, 242. For example, the recommendation program 132 may select one image from each of the image buckets 202, 212, 222, 232, 242. In a select example among the various possible image sequences for the illustrative exemplary embodiment, the recommendation program 132 may select image 204, image 214, image 224, image 234, and image 244 for a potential visual representation. The recommendation program 132 may also order the images in a sequence that corresponds to the terms of the input from the user of the smart device 110. Thus, the images may be ordered in a sequence where the sequence starts with the image 204, continues with the image 214, the image 224, and the image 234, and concludes with the image 244.

The recommendation program 132 may determine a global coherence and a local coherence for the selected sequence of images of a potential visual representation. As noted above, the recommendation program 132 may utilize the tags associated with each of the images in determining the global and local coherence for a potential visual representation.

In determining a global coherence, the recommendation program 132 may determine a tag popularity across the sequence of images (step 312). The global coherence may be sequence agnostic such that the recommendation program 132 determines an overall population of the tags among the images of the potential visual representation. The recommendation program 132 may select among a total number of different tags that are associated with the selected images. For example, the recommendation program 132 may omit tags that are only associated with a single image among the selected images. In another example, the recommendation program 132 may select the tags where at least two images share an association therewith. The recommendation program 132 may determine the global overlap of the tags from the selected images of the sequence to determine the global coherence (step 314). The recommendation program 132 may calculate the global overlap using any mechanism that represents the global coherence.

In determining a local coherence, the recommendation program 132 may determine a tag popularity across adjacent images in the sequence of the selected image (step 316). The local coherence may be sequence dependent such that the recommendation program 132 determines the local coherence between a first one of the images and a second one of the images that immediately follows the first image. Again, the recommendation program 132 may select among a total number of different tags that are associated with the selected images in a manner substantially similar to determining the global coherence. The recommendation program 132 may determine the local overlap of the tags from adjacent ones of the selected images of the sequence to determine the local coherence (step 318). The recommendation program 132 may calculate the local overlap using any mechanism that represents the local coherence.

Continuing with the illustrative exemplary embodiment, the recommendation program 132 may identify tags that are to be utilized in determining a global and local coherence for the potential visual representation. The recommendation program 132 may identify the tags to be used based on all the images of the selected images buckets 202, 212, 222, 232, 242 or based on the selected images of the potential visual representation. For illustrative purposes, the exemplary embodiments are described where the recommendation program 132 identifies the tags based on all the images of the selected image buckets 202, 212, 222, 232, 242.

FIG. 2B shows processing results 250 for the tags of the images of the image buckets 202, 212, 222, 232, 242, in accordance with the exemplary embodiments. Based on an operation to identify the tags in which the tags appear with a select popularity (e.g., above a predetermined threshold), the recommendation program 132 may identify the tags "apple," "orange," "fruits," and "table" that are to be utilized in determining the global and local coherence. The tags may be uniquely identified with a tag identification or id. For example, "apple" may have a tag id 1, "orange" may have a tag id 2, "fruits" may have a tag id 3, and "table" may have a tag id 4. Based on the above described tags for the images of the image buckets 202, 212, 222, 232, 242, the processing results 250 may indicate whether a particular tag is present or absent. For example, the recommendation program 132 may use a Boolean mechanism where the presence of the tag is indicated with a "1" and an absence of the tag is indicated with a "0." The processing results 250 may be an illustrative representation of results for a set of operations performed by the recommendation program 132. Accordingly, there is no requirement that the recommendation program 132 generate a chart of the processing results 250 in a manner consistent with the illustration in FIG. 2B.

Figure 2C:
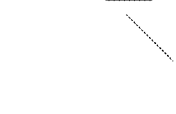

For the potential visual representation involving the selected images sequenced with images 204, 214, 224, 234, 244, FIG. 2C shows scoring results 275 based on the selected tags that are utilized in determining the global and local coherence. As shown, the image 204 having the image id 1 is associated with tag id 1, tag id 2, tag id 3, and tag id 4. The image 214 having the image id 4 is associated with tag id 3 and tag id 4. The image 224 having the image id 7 is associated with tag id 2, tag id 3, and tag id 4. The image 234 having the image id 10 is associated with tag id 1, tag id 3, and tag id 4. The image 244 having the image id 13 is associated with tag id 1, tag id 3, and tag id 4.

In determining the global coherence, the recommendation program 132 may determine the tag popularity for each tag for the selected images using a sequence agnostic approach. For example, for a global overlap ranging from 0 to 1, the recommendation program 132 may determine the global overlap according to the formula [(# buckets found in)/(total # buckets)]/(# tags). Thus, in the potential visual representation for the image sequence including images 204, 214, 224, 234, 244, the tag popularity results 277 may indicate that the tag popularity for tag id 1 is 3/5 or 0.6 as the tag id 1 only appears in images 204, 234, 244. The tag popularity for tag id 2 is 2/5 or 0.4 as the tag id 2 only appears in images 204, 224. The tag popularity for tag id 3 and tag id 4 is 5/5 or 1 as the tag id 3 and the tag id 4 appear in all images 204, 214, 224, 234, 244. Thus, using the above noted formula, the recommendation program 132 may determine the global overlap to be (0.6+0.4+1+1)/4=0.75. In this manner, the recommendation program 132 may determine the global coherence for the potential visual representation. For example, the global coherence may have a value that corresponds to the global overlap.

In determining the local coherence, the recommendation program 132 may determine the tag popularity for each tag for a pair of the selected images using a sequence dependent approach. For example, for a local overlap ranging from 0 to 1, the recommendation program 132 may determine the local overlap according to the formula [(# tags intersection between image n and image n−1)/(total # tags)]/(# buckets−1). Thus, in the potential visual representation for the image sequence including images 204, 214, 224, 234, 244, the tag popularity results 279 may indicate that the tag popularity for images 204, 214 is 2/4 or 0.5 as only tag id 3 and tag id 4 are in common. The tag popularity results 279 may indicate that the tag popularity for images 214, 224 is 2/4 or 0.5 as only tag id 3 and tag id 4 are in common. The tag popularity results 279 may indicate that the tag popularity for images 224, 234 is 2/4 or 0.5 as only tag id 3 and tag id 4 are in common. The tag popularity results 279 may indicate that the tag popularity for images 234, 244 is 3/4 or 0.75 as only tag id 1, tag id 3, and tag id 4 are in common. Thus, using the above noted formula, the recommendation program 132 may determine the local overlap to be (0.5+0.5+0.5+0.75)/4=0.56. In this manner, the recommendation program 132 may determine the local coherence for the potential visual representation. For example, the local coherence may have a value that corresponds to the local overlap.

The recommendation program 132 may determine whether there are further sequences of images that are available (decision 320). As noted above, there may be a plurality of images that may be selected in a sequence for consideration as potential visual representations. For example, there may be N buckets where bucket 1 has $x_1$ images, bucket 2 has $x_2$ images . . . and bucket N has $x_N$ images. Accordingly, there may be a total number of sequences that is a product of all the number of images (e.g., $x_1 \cdot x_2 \cdot \ldots \cdot x_N$). The recommendation program 132 may be configured to process each of the sequences of potential visual representations. As a result of there being a further sequence (decision 320, "YES" branch), the recommendation program 132 continues by selecting a new sequence of a potential visual representation and determine a global and local coherence for the new sequence. As a result of there being no further sequences (decision 320, "NO" branch), the recommendation program 132 processes the plurality of sequences.

The recommendation program 132 may generate and transmit a recommendation for the request from the user of the input provided through the smart device 110 (step 322). In generating the recommendation, the recommendation program 132 may select among the potential visual representations for the various sequences of selected images. The recommendation program 132 may select the potential visual representations based on a predetermined threshold. For example, the recommendation program 132 may utilize an overall threshold that the global and local coherence must satisfy for the potential visual representation to be selected.

In another example, the recommendation program 132 may utilize a global threshold that the global coherence must satisfy and a local threshold that the local coherence must satisfy for the potential visual representation to be selected. In a further example, the recommendation program 132 may utilize a global threshold that the global coherence must satisfy or a local threshold that the local coherence must satisfy for the potential visual representation to be selected. For illustrative purposes, the exemplary embodiments are described with regard to utilizing a global threshold and a local threshold where the potential visual representation must satisfy both thresholds. For the potential visual representations that satisfy the condition, the recommendation program 132 may identify these potential visual representations as recommended visual representations that are to be included in the recommendation that is transmitted to the user.

In an alternative exemplary embodiment, the recommendation program 132 may determine the global coherence and the local coherence for each sequence of selected images. The recommendation program 132 may utilize a sequence of the values of the global coherence and the local coherence to determine an overall coherence score of the potential visual representations. The recommendation program 132 may then select a predetermined number of the highest scoring potential visual representations to be included in the recommendation to the user. For the potential visual representations that are to be included, the recommendation program 132 may identify these potential visual representations as recommended visual representations.

In yet a further exemplary embodiment, the recommendation program 132 may receive preferences from the user regarding how to provide the recommendation. For example, the user may indicate a preference that the global coherence takes precedence over the local coherence. Thus, based on the highest global coherence scores of the potential visual representations, the recommendation program 132 may select a predetermined number of potential visual representations to include in the recommendation. The number of recommended visual representations that are to be included in the recommendation may also be selected as a preference by the user. The features involving user preferences may be incorporated into any of the above mechanisms in generating the recommendation for the user.

In the recommendation, the recommendation program 132 may include the images as well as other information. The recommendation program 132 may include the images in various ways. For example, the recommendation program 132 may include a full version of the images. In another example, the recommendation program 132 may include a smaller version of the images to aid the user in selecting a recommended visual representation without requiring an increased amount of data to be transmitted. The recommendation program 132 may also include information that aids the user in selecting one of the recommended visual representations. For example, the recommendation program 132 may include the global and/or local coherence corresponding to the recommended visual representation. The recommendation program 132 may include more granular information where the tag popularity of the tags that are utilized and/or the local overlap between adjacent images are provided for consideration by the user.

As a result of transmitting the recommendation to the user, the user may select one of the recommended visual representations. The recommendation program 132 may receive an input corresponding to this selection and transmit a visual representation to the user of the smart device 110 to be used for purposes of the user (step 324). The recommendation program 132 may be configured to package the visual representation in any manner that is compatible with a program that is used to show the visual representation.

Resuming with the illustrative exemplary embodiment, the recommendation program 132 may utilize a global threshold of at least 0.75 and a local threshold of at least 0.75 which both must be satisfied for a potential visual representation to be considered a recommended visual representation. As described above, the sequence of the selected images 204, 214, 224, 234, 244 has a global coherence of 0.75. Accordingly, the potential visual representation including the images 204, 214, 224, 234, 244 may satisfy the global threshold. However, the selected images 204, 214, 224, 234, 244 only has a local coherence of 0.56. Accordingly, the potential visual representation including the images 204, 214, 224, 234, 244 may not satisfy the local threshold. There may be a further sequence of selected images (not shown) that has a global coherence of 0.8 and a local coherence of 0.75. This sequence of a potential visual representation satisfies the global threshold and the local threshold. Thus, this sequence may be included as a recommended visual representation that is provided to the user.

Upon receiving the recommendation, the user may have selected the further sequence. As a result of the recommendation program 132 receiving the input from the user, the recommendation program 132 may transmit the images in the sequence based on an ordering of the terms from the request of the textual statement. Accordingly, using, for example, the video client 112, the user may show the visual representation with the textual statement for educational purposes.

The exemplary embodiments are configured to determine images to include in a visual representation where a global coherence and a local coherence is maintained through a sequence of the images. Based on a textual statement having a plurality of terms in a particular order, the exemplary embodiments are configured to identify the terms that are to be visualized in the visual representation. The exemplary embodiments identify image buckets having associated terms that correspond to the terms of the textual statement. The exemplary embodiments select images from each of the image buckets where a sequence of the selected images is processed to determine a global and local coherence. For sequences having a predetermined amount of global and local coherence, the exemplary embodiments generate a visual representation that is provided to the user.

The exemplary embodiments therefore address an issue of visualizing text by selecting a sequence of images such that a context is preserved through an automated mechanism. Whereas conventional approaches may lose script coherence and context if selection from image buckets is not done intelligently or inefficiently through a manual approach, the exemplary embodiments determine global and local coherence scores based on label intersections across the image buckets and selected images from the image buckets. In this manner, the exemplary embodiments consider all possible cross image bucket combinations for image-sequence generation of the visual representation. For example, a per image sequence may compute a global overlap score. In another example, a per image sequence may compute a local overlap score. In a further example, global and local scores may be used to generate a ranking per image sequence. In yet another example, the image sequence may be selected having the highest ranking.

Those skilled in the art will understand the significance of maintaining a global and local coherence in a sequence of images used in a visual representation. For example, the exemplary embodiments takes advantage of a trade-off algorithm that maximizes a global and local coherence where there is a high number of concept overlap across an entire image sequence and a high coherence amongst transitions of the images.

Figure 4:
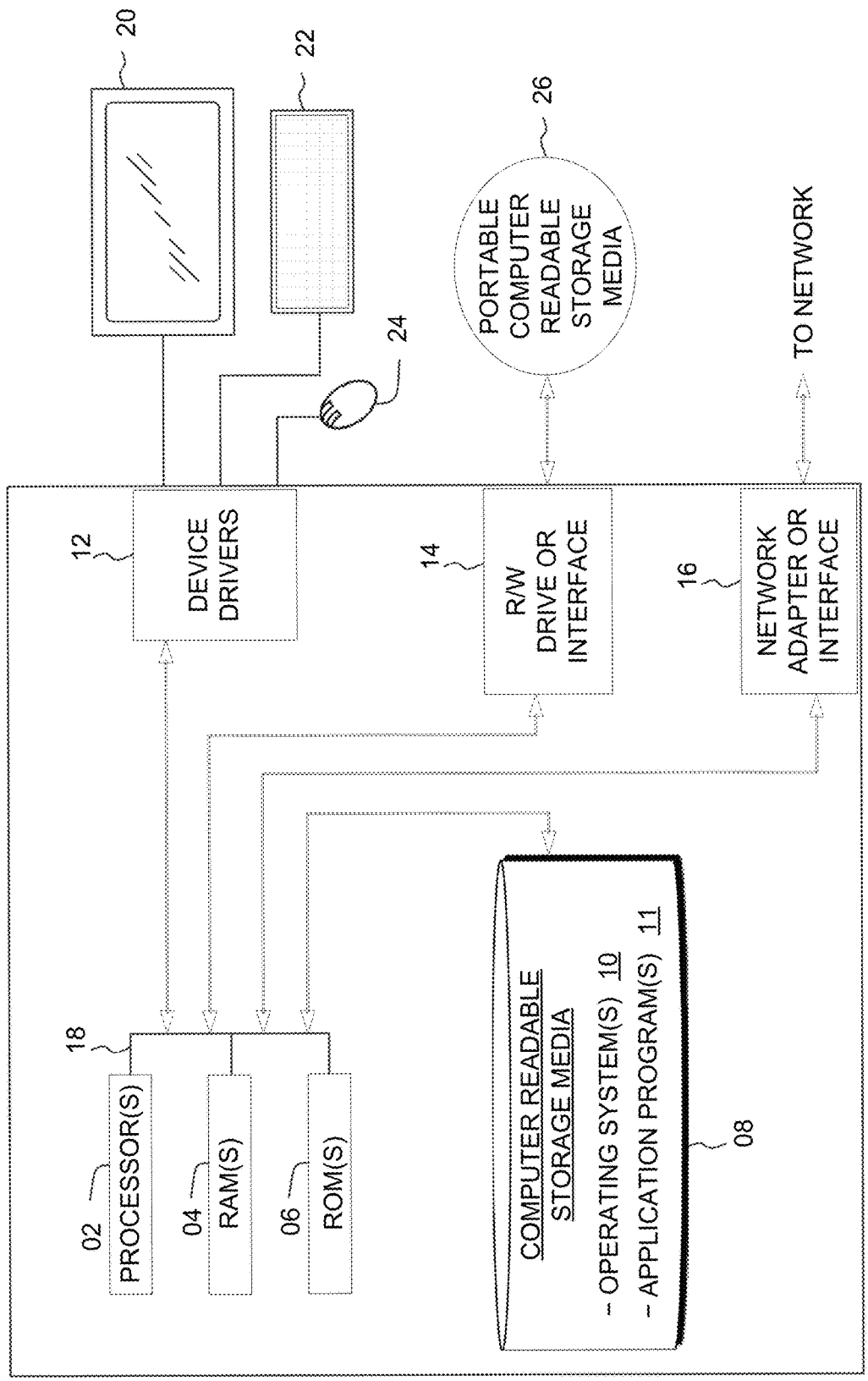
FIG. 4 depicts an exemplary block diagram depicting the hardware components of the image selection system 100 of FIG. 1, in accordance with the exemplary embodiments.

FIG. 4 depicts a block diagram of devices within the image selection system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
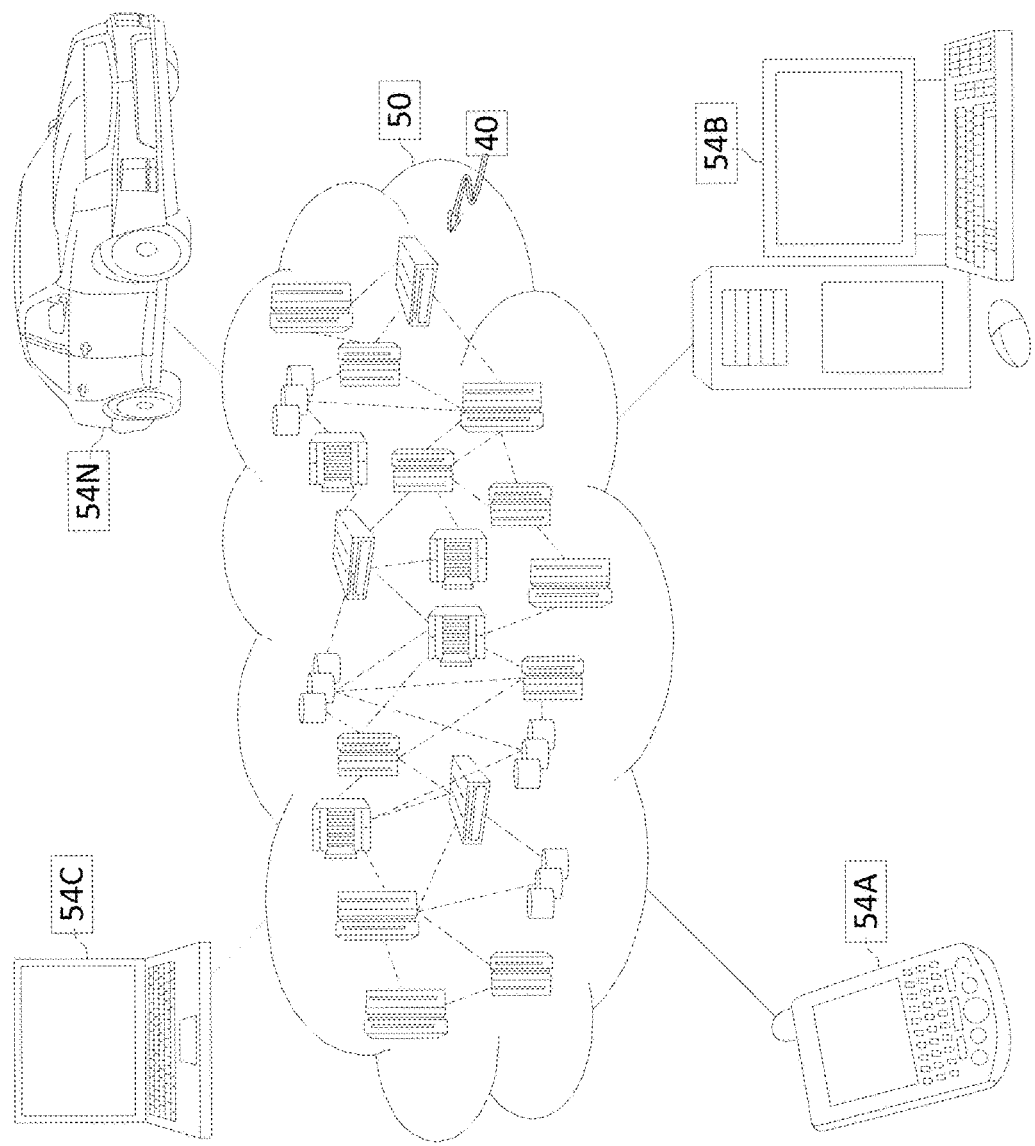
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for determining and arranging images to include in a visual representation, the method comprising:
receiving a textual statement;
identifying a plurality of terms in the textual statement that are to be visualized in the visual representation, the plurality of terms being ordered in a statement sequence that corresponds to an input for the textual statement;
generating a plurality of sequences of images where each image in a given one of the sequences is associated with one of the terms, each image being associated with at least one tag, each image in the given one of the sequences being arranged according to the statement sequence;
determining a global coherence and a local coherence for each of the sequences based on the tags of the images, the local coherence being determined for each of the sequences in the statement order;
selecting one of the sequences based on the global coherence and the local coherence; wherein a sequence of values is calculated for each global and local coherence, including a tag popularity score to determine highest scoring values used for said selecting one of said sequences;
determining any local overlap of the tags from adjacent ones of said selected images of the sequence to determine the local coherence; wherein said local coherence determines an order of images so that a second image immediately follows a first image; and
generating the visual representation where the images of the selected sequence are included in the statement sequence.

2. The computer-implemented method of claim 1, further comprising:
identifying a plurality of image buckets having a respective associated term based on the identified terms in the textual statement, wherein the images for the given sequence are selected from the identified image buckets.

3. The computer-implemented method of claim 1, wherein the global coherence is sequence agnostic.

4. The computer-implemented method of claim 1, wherein the local coherence is based on adjacent images within the sequence of images.

5. The computer-implemented method of claim 1, wherein the selected sequence is selected based on whether the global coherence is at least a predetermined global threshold, whether the local coherence is at least a predetermined local threshold, or a combination thereof.

6. The computer-implemented method of claim 1, wherein the selected sequence has a highest global coherence, a highest local coherence, or a combination thereof.

7. A computer program product for determining and arranging images to include in a visual representation, the computer program product comprising:
one or more non-transitory computer-readable storage media and program instructions stored on the one or more non-transitory computer-readable storage media capable of performing a method, the method comprising:
receiving a textual statement;
identifying a plurality of terms in the textual statement that are to be visualized in the visual representation, the plurality of terms being ordered in a statement sequence that corresponds to an input for the textual statement;
generating a plurality of sequences of images where each image in a given one of the sequences is associated with one of the terms, each image being associated with at least one tag, each image in the given one of the sequences being arranged according to the statement sequence;
determining a global coherence and a local coherence for each of the sequences based on the tags of the images, the local coherence being determined for each of the sequences in the statement order;
selecting one of the sequences based on the global coherence and the local coherence; wherein a sequence of values is calculated for each global and local coherence, including a tag popularity score to determine highest scoring values used for said selecting one of said sequences;
determining any local overlap of the tags from adjacent ones of said selected images of the sequence to determine the local coherence; wherein said local coherence determines an order of images so that a second image immediately follows a first image; and generating the visual representation where the images of the selected sequence are included in the statement sequence.

8. The computer program product of claim 7, wherein the method further comprises:
identifying a plurality of image buckets having a respective associated term based on the identified terms in the textual statement, wherein the images are selected from the identified image buckets.

9. The computer program product of claim 7, wherein the global coherence is sequence agnostic.

10. The computer program product of claim 7, wherein the local coherence is based on adjacent images within the sequence of images.

11. The computer program product of claim 7, wherein the selected sequence is selected based on whether the global coherence is at least a predetermined global threshold, whether the local coherence is at least a predetermined local threshold, or a combination thereof.

12. The computer program product of claim 7, wherein the selected sequence has a highest global coherence, a highest local coherence, or a combination thereof.

13. A computer system for determining and arrange images to include in a visual representation, the computer system comprising:
one or more computer processors, one or more computer-readable storage media, and program instructions stored on the one or more of the computer-readable storage media for execution by at least one of the one or more processors capable of performing a method, the method comprising:
receiving a textual statement;
identifying a plurality of terms in the textual statement that are to be visualized in the visual representation, the plurality of terms being ordered in a statement sequence that corresponds to an input for the textual statement;
generating a plurality of sequences of images where each image in a given one of the sequences is associated with one of the terms, each image being associated with at least one tag, each image in the given one of the sequences being arranged according to the statement sequence;
determining a global coherence and a local coherence for each of the sequences based on the tags of the images, the local coherence being determined for each of the sequences in the statement order;
selecting one of the sequences based on the global coherence and the local coherence; wherein a sequence of values is calculated for each global and local coherence, including a tag popularity score to determine highest scoring values used for said selecting one of said sequences;
determining any local overlap of the tags from adjacent ones of said selected images of the sequence to determine the local coherence; wherein said local coherence determines an order of images so that a second image immediately follows a first image; and
generating the visual representation where the images of the selected sequence are included in the statement sequence.

14. The computer system of claim 13, wherein the method further comprises: identifying a plurality of image buckets having a respective associated term based on the identified terms in the textual statement, wherein the images are selected from the identified image buckets.

15. The computer system of claim 13, wherein the global coherence is sequence agnostic.

16. The computer system of claim 13, wherein the local coherence is based on adjacent images within the sequence of images.

17. The computer system of claim 13, wherein the selected sequence is selected based on whether the global coherence is at least a predetermined global threshold, whether the local coherence is at least a predetermined local threshold, or a combination thereof.

18. The computer system of claim 13, wherein the selected sequence has a highest global coherence, a highest local coherence, or a combination thereof.

* * * * *